Aug. 29, 1933.    R. W. HART    1,924,156
MEANS AND METHOD OF MEASURING DISTANCE
Filed May 19, 1930

INVENTOR
ROBERT W HART
By Ezekiel Wolf
ATTORNEY

Patented Aug. 29, 1933

1,924,156

UNITED STATES PATENT OFFICE 1,924,156

MEANS AND METHOD OF MEASURING DISTANCE

Robert Winfield Hart, Lynn, Mass., assignor to Submarine Signal Company, Boston, Mass., a Corporation of Maine Application May 19, 1930. Serial No. 453,725

6 Claims. (Cl. 250—1)

The present invention relates to a means and method of measuring distance by the use of radiant energy particularly electromagnetic waves.

In my companion application executed of even date and filed at the same time as this application, Robert W. Hart, Serial No. 453,726, I describe a method and means of determining heights and distances, particularly for use in finding the height of an aircraft above the ground by means of a system employing modulated high frequency radio waves. In this companion application the distance is measured by synchronizing the direct and reflected modulated waves.

In the present application there is described a means and method whereby overmodulated high frequency waves may be used. This method and apparatus have the same advantages that the apparatus described in the companion application has over the prior art. The advantage of the present system over that disclosed in the companion application is the absence of any moving mechanical parts.

Figure 1:
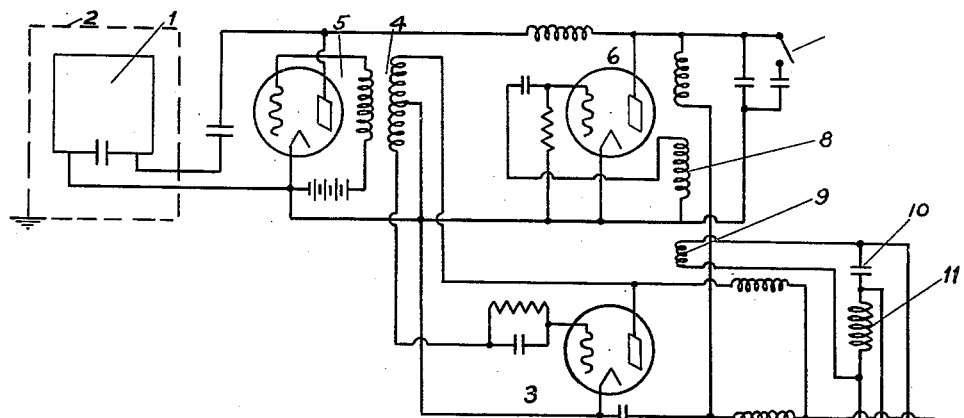
Figure 3:
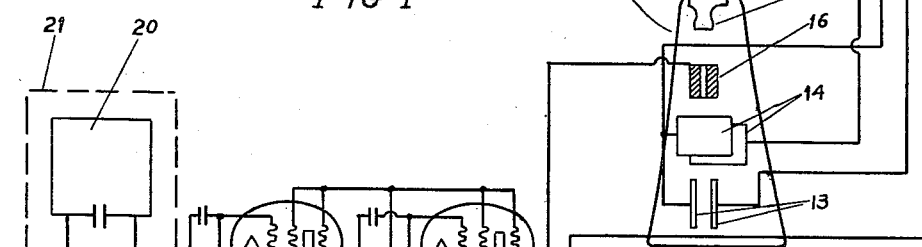
Figure 2:
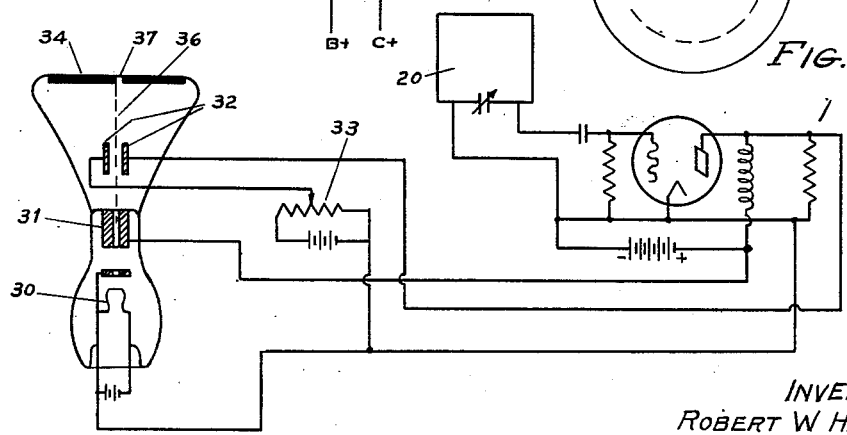

The present invention will be more fully described in connection with the drawing in which Fig. 1 shows schematically the system, Fig. 2 shows a modification and Fig. 3 shows an end view of the cathode ray tube described in the specification.

In Fig. 1 the antenna 1 is used to emit the overmodulated high frequency waves. This may be shielded by a shield 2 substantially as described in my companion application. The source of wave energy is derived from an oscillating circuit 3 which oscillates at the high frequency carrier wave to be used and which impresses this high frequency by means of the coupling coil 4 upon an amplifier circuit 5.

The modulating wave is supplied from the oscillatory circuit 6 which oscillates at the modulating frequency and which impresses its modulating current into the plate filament circuit of the amplifier 5. While, therefore, the amplifier 5 is tuned to the high frequency signal, it is modulated at the desired frequency. A switch S is provided in the modulated circuit so that there may be a choice of two modulating frequencies for the operator to use. Coupled with the coil 8 of the modulating circuit 6 is a coil 9 across which is a capacity 10 and inductance 11. This inductance and capacity serve to control the voltage on the plates of the cathode ray tube 12, the capacity 10 being connected across the plates 13, 13 while the inductance 11 is connected across the plates 14, 14. The cathode ray tube is provided with a cathode 15 and an anode 16. The modulating wave impressed upon the plates 14 and the plates 13 create a rotating electron beam which is visible at the end of the tube marked 17 at the lower part of the figure. The diameter of rotation of the beam is dependent upon the voltage between the cathode and the anode of the amplifier 5. When the voltage is greater, the diameter of the figure on the end of the tube marked by the rotating beam is smaller.

During one complete modulating cycle the beam will make one complete rotation. The rotating period of the beam and the interval between periodic signals should be commensurate with each other so that the beam has the same relative position with respect to the measuring scale.

During this cycle there will be emitted from the antenna 1 a short group of vibrations when the amplitude of the modulating wave is such as to allow the amplifier circuit to radiate the carrier frequencies. These trains of high frequency vibrations will be peaked depending upon the shape of the modulating wave and will have the period of the modulating wave. These trains of vibration emitted at the modulated frequency will be picked up after reflection from the object whose distance is being measured by the antenna 20 which may be of the loop type described in my companion application and which may be shielded by the shield 21, and passed through a receiving circuit. The receiving circuit 22 may be of the usual type but I preferably employ, as shown in my companion application, screen grid receiving means, since the capacities of the short wave systems may thereby be more easily controlled. The receiving circuit 22 has its output impressed across the filament anode or cathode-anode of the Braun tube 12. When a periodic vibration is received, the voltage across the cathode-anode will change, and, in the rotating beam there will be present a serration 23 adjacent to the scale 24 on the end of the tube.

Since the modulating frequency may be, and preferably is, a radio frequency wave, the serrations 23 will be repeated successively at the same position of the scale and will, therefore, give a continuous reading.

In place of the method shown in Fig. 1 for indicating the received impulse, the modification shown in Fig. 2 may be used in which a constant potential is applied between the filament or cathode 30 and the anode 31 and in which the incoming signal is impressed across the control plates 32, 32. The control plates 32 have initially a potential impressed upon them by means of the potentiometer 33 sufficient to cause the beam passing through the anode 31 to fall on the mask portion 34 of the tube. When the reflected signal is received by the receiving circuit, it causes a change in voltage across the plates 32 and shifts the beam shown by the dotted line 36 to the opening 37 in the mask.

Instead of using a straight slit, the slit should preferably be circular when applying the method described in connection with Fig. 1 and the beam normally should rotate either just inside or outside of the slit so that it is not visible and so that the incoming signal will just make it visible. The tube, therefore, will momentarily produce a visual signal. Instead of producing the serration by means of the change in anode potential, the indication may be produced by a separate electrode in the form of a conducting coil within or about the outside of the tube above the control plates or by a coil connected to the receiving circuit.

Having now described my invention, I claim:

1. A system for measuring distance including a source of high frequency electromagnetic waves, means for overmodulating said high frequency waves to produce periodic high frequency vibrations, means for receiving said periodic high frequency vibrations after reflection from the object whose distance is to be measured, a cathode ray tube, means for impressing said modulating frequency on said cathode ray tube to create a rotating electron beam and means operated by said receiving means to affect momentarily the anode voltage of said tube to produce an indication and a scale adjacent thereto to indicate the distance.

2. In a system for measuring distance, a cathode ray tube having control plates, means for emitting periodically high frequency vibrations, means for causing a sinusoidal voltage variation on said control plates for rotating an electron beam at a period commensurate with the interval between the periodic signals, means for receiving the emitted wave after reflection and means operated by the receiving means to produce momentarily an anode voltage variation when the signal is received whereby an indication is produced and a scale for reading the distance.

3. In a system for measuring distance, a cathode ray tube having control plates, means for emitting periodically high frequency vibrations, means for causing a sinusoidal voltage variation on said control plates for rotating an electron beam at a period commensurate with the interval between the periodic signals, means for receiving said emitted wave after reflection and means operated by the receiving means to produce a momentary serration of the rotating electron beam when the signal is received whereby an indication is produced and a scale for reading the distance.

4. A system for measuring distance including means for creating high frequency electromagnetic waves, means for overmodulating said waves to produce periodically high frequency vibrations, means for receiving the waves after reflection from the object whose distance is to be measured including a cathode ray tube having a visible beam and means operated by the modulating wave for rotating the same, said tube having an anode and means connecting said receiving circuit with said anode for momentarily moving the beam radially of its rotation and a scale to indicate the distance.

5. A system for measuring distance including means for creating high frequency electromagnetic waves, a modulating source, means operated thereby for overmodulating said waves to emit periodically high frequency vibrations, means for receiving the waves after reflection from the object whose distance is to be measured, timing means including a visual indicator and means controlled from said modulating source for operating said timing means in proper synchronism with the periodic vibrations, a scale associated with said timing means and means operated by the receiving means for producing an indication with said indicator.

6. A system for measuring distance including means for creating high frequency electromagnetic waves, a modulating source, means operated thereby for overmodulating said waves to emit periodically high frequency vibrations, means for receiving the waves after reflection from the object whose distance is to be measured, timing means including a cathode ray tube and means operated from the modulating source to produce a movement of the beam in time synchronism with the emission of the high frequency vibrations and means within said tube operated by said receiving means for producing an indication by a second movement of the beam imposed upon the first movement.

ROBERT WINFIELD HART.